United States Patent [19]
Minakata et al.

[11] Patent Number: 6,111,682
[45] Date of Patent: Aug. 29, 2000

[54] LIGHT MODULATORS

[75] Inventors: Makoto Minakata, Hamamatsu; Jungo Kondo; Takashi Yoshino, both of Aichi Pref.; Minoru Imaeda, Nagoya, all of Japan

[73] Assignee: NGK Insulatros, Ltd.

[21] Appl. No.: 09/158,718

[22] Filed: Sep. 22, 1998

[30] Foreign Application Priority Data

Sep. 29, 1997 [JP] Japan .................................. 9-263331

[51] Int. Cl.[7] ...................................................... G02F 1/03
[52] U.S. Cl. ............................................................ 359/245
[58] Field of Search .................................. 359/245, 254; 385/2, 3

[56] References Cited

U.S. PATENT DOCUMENTS 5,473,711  12/1995  Hakogi et al. ............................. 385/14
5,742,423  4/1998  Ido et al. ................................. 359/254

FOREIGN PATENT DOCUMENTS 3-204614  9/1991  Japan .

*Primary Examiner*—Georgia Epps
*Assistant Examiner*—Ricky Mack
*Attorney, Agent, or Firm*—Wall Marjama Bilinski & Burr

[57] ABSTRACT

A light modulator for modulating light upon application of a signal voltage, said light modulator including a substrate, an optical waveguide formed on a side of a front surface of the substrate, and first and secondary electrodes for applying the signal voltage to the light propagating through the optical waveguide, the first electrode being formed on a front surface side of the optical waveguide and including a main portion covering the front surface side of the optical waveguide and a first overhanging portion hanging over toward one side from the main portion.

20 Claims, 12 Drawing Sheets

FIG_3

FIG_11

LIGHT MODULATORS

BACKGROUND OF THE INVENTION

1. Field of the Invention

The present invention relates to light modulators such as traveling-wave light modulators.

2. Related Art Statement

In the optical communication field, it is predicted that since communication capacity will drastically increase, the capacity of the light transmitting system needs to be enlarged. At present, the light transmission speed of 2.4 Gb/sec. has been put into practical use. However, as compared with the frequency band (about 200 THz) in which transmission can be effected through optical fibers, the practically employed level is merely one hundred thousandth at the maximum. What is important in drastically increasing the transmission capacity is to develop light modulation technology.

There is the possibility that a traveling-wave light modulator having lithium niobate ($LiNbO_3$), lithium tantalate ($LiTaO_3$), potassium lithium niobate (KLN), potassium titanyl phosphate (KTP) or gallium-arsenide (GaAs) used as an optical waveguide, which modulator has excellent characteristics, can realize a broad band width at a high efficiency. Lithium niobate and lithium tantalate are extremely excellent materials as a ferroelectric material, and favorably have large electro-optical coefficients and can control light within a short optical path.

Factors which suppress the modulation frequency of the traveling-wave light modulator include velocity mismatch, dispersion, and electrode power loss. Among them, since velocity mismatch and dispersion are principally determined by the structure of the traveling-wave light modulator, it is important to analyze the structure and make an appropriate design thereof. On the other hand, conductivity and surface skin effect of the material are important for the electrode power loss.

The concept of velocity mismatch is now further explained. In the traveling-wave light modulator, the velocity of the light propagating along the optical waveguide largely differs from that of an electric signal (microwave) propagating along the electrode. Assume that the velocity of light and that of the microwave propagating through the crystal are taken as Vo and Vm, respectively. For example, in the case of the $LiNbO_3$ having planar type electrodes, the refractive index of the $LiNbO_3$ single crystal is 2.15 (wavelength: 1.5 $\mu m$), and the velocity of the light propagating through the optical waveguide is inversely proportional to the refractive index. On the other hand, the effective refractive index for a modulation wave is given by a square root of the dielectric constant near the conductor. The $LiNbO_3$ single crystal is a uniaxial crystal, with a dielectric constant in the Z-axis direction of 28 and in the X-axis and Y-axis directions of 43. Therefore, even if an influence of air having the dielectric constant of 1 is taken into account, the effective refractive index of the $LiNbO_3$ modulator having a conventional structure is about 4, which is about 1.9×2.14. Therefore, the velocity of the light wave is about 1.9 times as much as that of the modulation wave.

The upper limit of the bandwidth fm of the light modulation or the modulating velocity is proportional to the reciprocal of a difference in velocity between the light wave and the microwave. That is, $fm=1/(Vo-Vm)$. Therefore, assuming that the power loss by electrode is zero, a limit is a bandwidth fm time the electrode length M=9.2 GHz·cm. Actually, it is reported that in a light modulator having an electrode length of M=2.5 mm, fm=40 GHz. The effect due to the limit of the operation speed becomes more conspicuous as the electrodes become longer. Therefore, a light modulator having a broad bandwidth and high efficiency is in demand.

Recently, it has been proposed in the case of an optical waveguide device, such as the optical waveguide-type high speed modulators and high speed switches, that the phase matching frequency between the light propagated through the optical waveguide and the modulating voltage applied from the outside is shifted to a higher side by tens of GHz through designing the configuration of an upper electrode on a substrate in a special shape or forming an accumulated layer of glass ("EO devices using LN" in "O plus E", May 1995, pp 91–97).

According to this literature, since the speed of the microwave is determined by the average value of the dielectric constant of an area through which electric forces pass between a thin signal electrode and an earth electrode, the modulating speed is increased by thickening the electrode and using a buffer layer composed of $SiO_2$. Further, since the traveling-wave electrode constitutes a traveling passage, its characteristic impedance needs to be increased to around 50. In order to satisfy the above requirements, it is proposed that the electrode and the buffer layer be designed in a protruded shape, a hang-over shape, a grooved shape, a sealed shape or the like.

However, the thus constructed traveling-wave light modulator requires a complicated production process with a larger number of steps at a high cost. In addition, the optical waveguide must be kept aligned with the buffer layer, with the electrodes having the complicated configurations at a high accuracy. Furthermore, characteristics such as refractive index are likely to be changed by the formation of a working denatured layer due to damages in working, and according to a simulation result of an optical waveguide device, the characteristics are degraded and a light absorption characteristic and an extinction ratio characteristic become insufficient. Although the above difficult problems resulting from the production process are solved, it is still difficult to realize high speed modulation of not less than 10 GHz·cm.

SUMMARY OF THE INVENTION

It is an object of the present invention to provide a light modulator for modulating the light upon application of a signal voltage, which has a novel structure the able to realize the velocity matching between the light and the modulation wave at a higher frequency as compared with a conventional light modulator and can be thereby operable at a frequency of not less than tens of GHz.

The present invention relates to a light modulator for modulating light upon application of a signal voltage, the light modulator comprising a substrate, an optical waveguide formed on a side of a front surface of the substrate, and first and secondary electrodes for applying the signal voltage to the light propagating through the optical waveguide, the first electrode being formed on a front surface side of the optical waveguide and including a main portion covering the front surface side of the optical waveguide and an overhanging portion hanging over toward one side from the main portion.

These and other objects, features and advantages of the invention will be appreciated upon reading of the following description of the invention when taken in conjunction with the attached drawings, with the understanding that some modifications, variations and changes of one same could be easily made by the skilled in the art to which the invention pertains.

BRIEF DESCRIPTION OF THE DRAWINGS

For a better understanding of the invention, reference is made to the attached drawings, wherein.

DETAILED DESCRIPTION OF THE INVENTION

The present inventors conducted various simulations and experiments over an extended time period in order to produce a light modulator with a substrate is made of a material having a high dielectric constant, for example, lithium niobate, the light modulator is operable at an extremely high frequency range of not less than tens of GHz which has not been realized before. As a result, the present inventors discovered that the propagating speed of the light through the optical waveguide can be matched with the speed of the modulation wave at an extremely high frequency by making the width of a first electrode provided on the optical waveguide larger than that of the optical waveguide and hanging at least a part of the first electrode over from the optical waveguide in a side direction. The inventors reached the present invention based on this discovery. The present invention is epoch-making and industrially largely contributable in that the light modulation and the light transmission have been first realized in a band of tens of GHz and in a band of 100 GHz.

Figure 11:
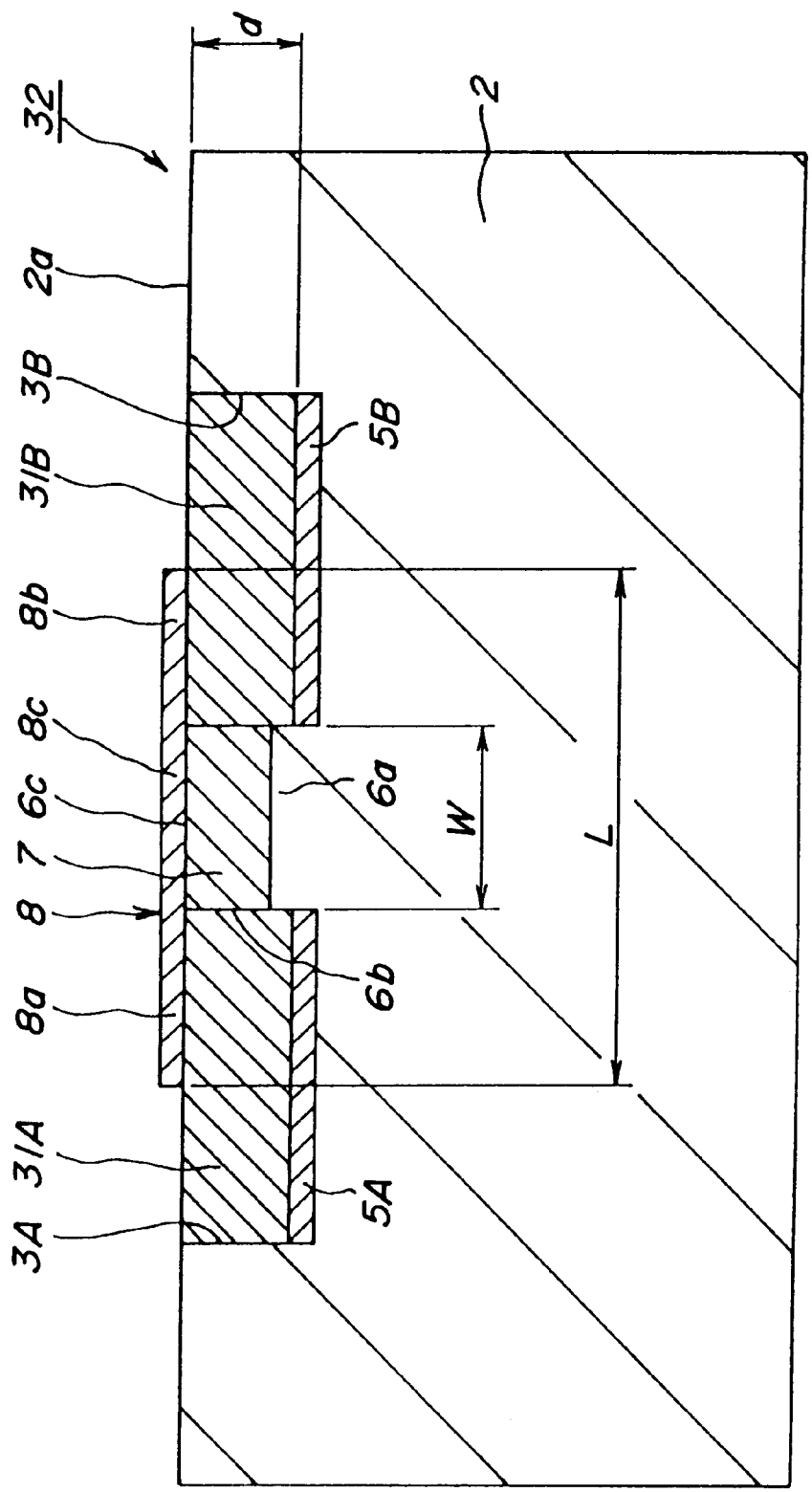
FIG. 11 is a cross-sectional view of a light modulator 32 as still another embodiment of the present invention.

When the first electrode overhangs from the optical waveguide as mentioned above, and a given signal voltage is applied between this first electrode and the other, the voltage is also applied to a gap between the electrodes, that is, air layers (See 4A and 4B in FIG. 1 and 24A and 24B in FIG. 6) or filled layers of a low dielectric material (See 31A and 31B of FIG. 11). It is believed that the dielectric constant of the area where the modulation wave advances consequently decreases and the speed of the modulation wave increases.

It is clarified that the surface area of the electrodes increases owing to the adoption of the structure in which a part of the first electrode overhangs an at least one side, so that electrode power loss is largely reduced.

The substrate is preferably made of at least one kind of single crystal selected from the group consisting of a lithium niobate single crystal, a lithium tantalate single crystal, a lithium niobate lithium tantalate solid solution single crystal, a potassium lithium niobate single crystal, a potassium lithium niobate-potassium lithium tantalate solid solution single crystal, a potassium titanyl phosphate single crystal and a gallium-arsenic single crystal. The substrate is particularly preferably made of one or more kinds of the single crystals selected from the group consisting of the lithium niobate single crystal, the lithium tantalate single crystal, and the lithium niobate-lithium tantalate solid solution single crystal.

Further, the orientation of the substrate may be in any one of Z, X and Y directions. A conventional method for forming the optical waveguide according to diffusion of titanium and for forming the electrode on the optical waveguide can be used.

In the present invention, the first electrode is preferably provided with another overhanging portion at the other side.

In the present invention, it is preferable that the other electrode is formed in an inner side of the substrate as compared with the first electrode, and that the optical waveguide is located at an area between the opposite electrodes. By so doing, the signal voltage is easily and uniformly applied to the entire optical waveguide between the electrodes.

In a particularly preferred embodiment, the substrate is provided with a ridged portion, an optical waveguide is provided in the ridged portion, one electrode is formed on the optical waveguide, the other opposed electrodes are provided in opposite recesses formed at opposite sides of the ridged portion, respectively, and opposite overhanging portions of the first electrode are opposed to the other electrodes, respectively. By this construction, the frequency at which the velocity of the light is matched with that of the modulation wave can be further increased.

In this embodiment, the electrodes can be provided directly to the surface of the substrate inside the two recesses, respectively. Alternatively, an underlayer made of a material having a dielectric constant smaller than that of the material constituting the substrate is provided in each of the recesses, and the second electrode is is formed on the underlayer. By so doing, the frequency at which the velocity of the light is matched with that of the modulation wave can be increased.

The value L/W obtained by dividing the width L of the above one electrode by that W of the optical waveguide is preferably not less than 1.5 to not more than 50.

The method of producing the light modulator according to the present invention is not particularly limited. A known technique may be used to provide the optical waveguide or the electrodes on the surface of the substrate. Although the configuration of the substrate is not particularly limited, a substrate having a flat planar shape with two main planes is particularly preferred.

A conventional etching technique may be used for providing the ridged portion at the substrate, but the following technique may be also used.

Various lasers may be used in the ablation working, and an excimer laser is particularly preferable. The ablation working is a working method for obtaining a desired shape by irradiating a light having a high energy, such as an excimer laser beam, upon a material to be worked, and instantly decomposing and evaporating the irradiated portion. The excimer laser is a laser beam in an ultraviolet zone which has a wavelength of 150 to 300 nm and is characterized in that the wavelength can be selected depending upon a gas to be sealed.

The present inventors discovered that when the ridged portion is formed at the ferroelectric substrate by the ablation working with the excimer laser, the ridged portion can be formed with extremely high productivity. In addition, the resulting ridged portion has conspicuous stability in both its optical characteristics and configuration.

It is considered that the reason why the optical characteristics are stable is that since the material of the substrate at a portion where the light is irradiated is instantly decomposed and evaporated by the ablation working, the peripheral portion where the light did not directly hit is almost not influenced with heat or pressure, so that no working-denatured layer is consequently formed at a thin portion.

It is necessary that light having a wavelength shorter than that of an absorption end of the material of the substrate is used as a light source for the ablation working. However, light having a wavelength of not more than 350 nm is ordinarily preferably used.

The wavelength of the light in the ablation working is more preferably not more than 300 nm. As the actual light source, the fourth harmonic generation wave of a YAG laser (a laser beam of 266 nm), an excimer lamp or the like is practically used besides the excimer laser light source.

A so-called simultaneous type irradiator and a so-called multi-reflective type irradiator are used as the light irradiator for the ablation working, and either one of them may be used.

The ridged portion can be also formed at the front surface side of the substrate by high precision mechanical working. In this case, A cutting technique is most preferable. device, a slicing device in which a positional accuracy in a Z-direction is enhanced is preferably used.

In the following, the present invention is explained in more detail with reference to the drawings.

Figure 1:
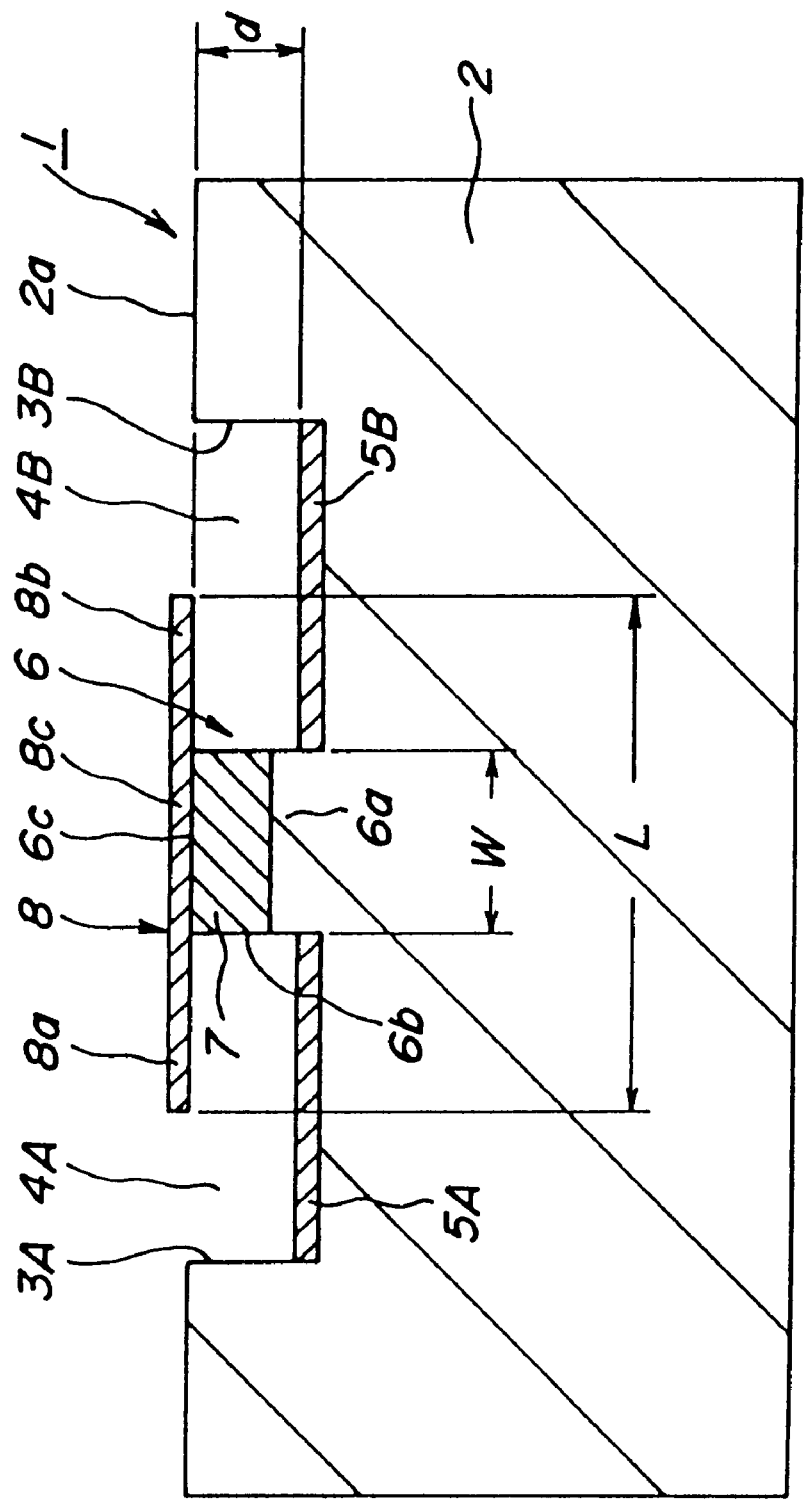
FIG. 1 is a cross-sectional view of a light modulator 1 as one embodiment of the present invention.
Figure 2:
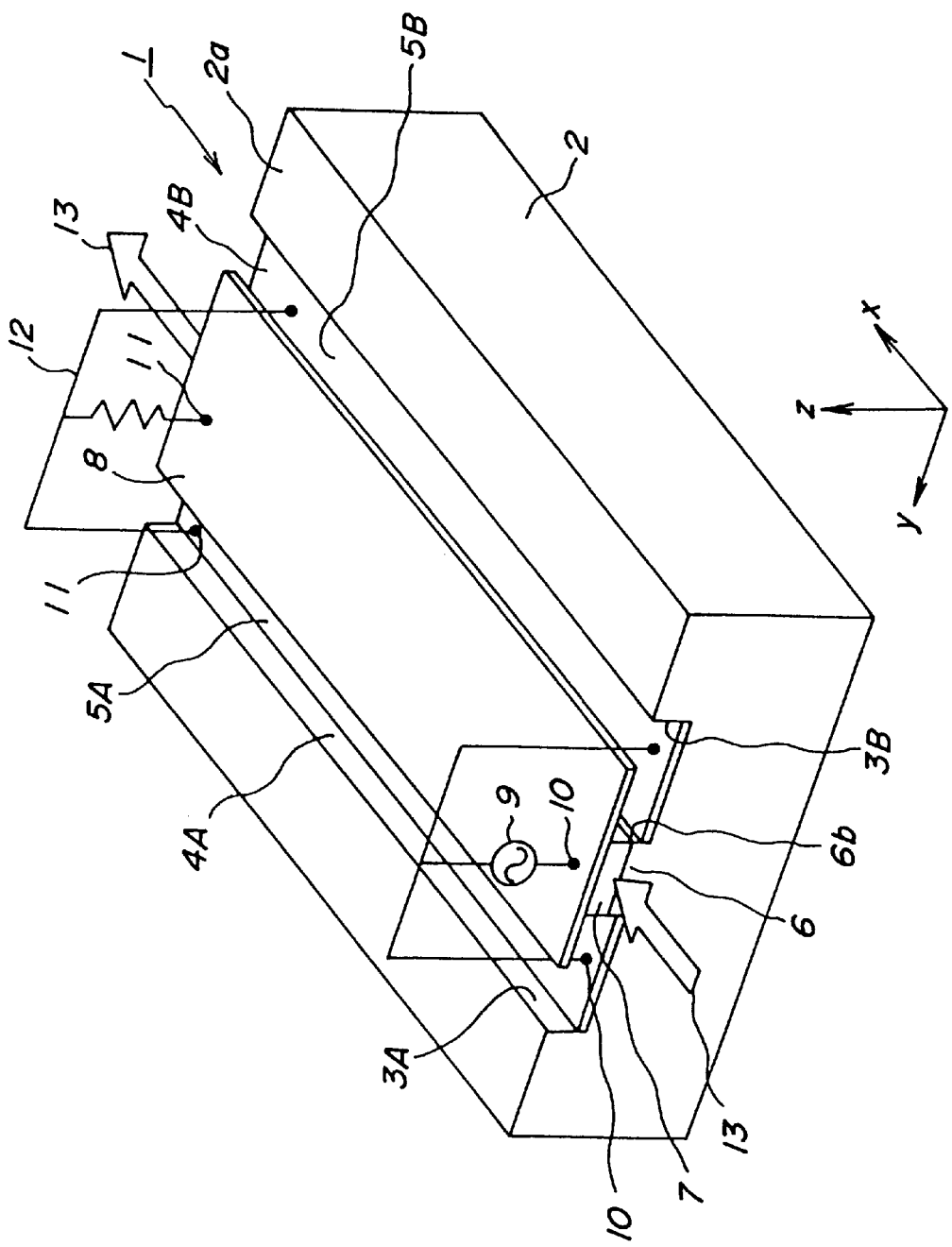
FIG. 2 is a perspective view of the light modulator in FIG. 1.

FIG. 1 is a cross sectional view of a light modulator 1 according to an embodiment of the present invention, and FIG. 2 is a perspective view of the light modulator 1 in FIG. 1. The light modulator includes a substrate 2 having a flat-board shape, an optical waveguide 7 formed on a side of a front surface 2a of the substrate 2, and one electrode 8 and the other electrodes 5A and 5B for applying a signal voltage to light propagating through the optical waveguide 7.

The substrate 2 includes a ridged portion 6, and the optical waveguide 7 is provided in an upper portion of the ridged portion 6. A base portion 6a of the ridged portion 6 is provided under the optical waveguide 7. A reference numeral 6b denotes a side surface of the ridged portion 6, and a reference numeral 6c denotes an upper surface of the ridged portion 6. A first recess 3A is provided at one side of the ridged portion 6, and a second recess 3B is provided at the other side of the ridged portion 6. A first electrode 8 is provided on the upper surface 6c of the ridged portion 6, and secondary electrodes 5A and 5B are provided in the first and second recesses 3A and 3B, respectively. Therefore, the secondary electrodes 5A and 5B are formed in an inner side of the substrate 2 as compared with the first electrode 8, and the optical waveguide 7 is located at a zone between the first electrode 8 and the secondary electrodes.

The first electrode 8 includes a main portion 8c covering the front surface of the optical waveguide 7, a first overhanging portion 8a hanging over from the main portion 8c toward one side and a second overhanging portion 8b hanging over from the main portion 8c toward the other side. As a result, the first and second overhanging portions 8a and 8b are opposed to the secondary electrodes 5A and 5B, respectively.

An oscillator 9 is connected to one end of each of the electrodes via a contact 10, whereas a terminal resistance 12 is connected to the other end of each of the electrodes via a contact 11. A reference numeral 13 denotes a light beam.

The light modulator 1 outlined in FIGS. 1 and 2 was produced, and subjected to experiments and simulations. Results are shown in FIG. 3, 4 and 5.

A film of a lithium niobate-lithium tantalate solid solution single crystal was formed in a thickness of 10 μm on a substrate made of a Z-cut wafer ($LiNbO_3$ single crystal, 1 mm thick) by a liquid phase epitaxial method, and a film of lithium niobate was formed in a thickness of 10 μm on the resulting film. Then, the resultant was subjected to ablation working by using a KrF excimer laser (wavelength: 248 nm) as a light source. An optical system was adjusted to give the density of an irradiated energy of 6 $J/cm^2$, whereas the pulse width was set at 15 nsec, the pulse frequency at 600 Hz, and the scanning speed at 1.2 mm. Under the above condition, a ridged portion 6 of a Mach-Zehnder type was formed. The cross sectional shape of the ridged portion 6 was trapezoidal, and an inclined angle of a side surface 6b of the ridged portion 6 to a main plane 2a was 90 degrees.

Gold electrodes 5A and 5B were formed in a thickness of 1 μm in recesses 3A and 3B, respectively, by vapor deposition. Further, the other gold electrode 8 was formed in a thickness of 1 μm on a glass substrate (not shown) by photolithography. The glass substrate and the electrode 8 were bonded to an upper surface 6c of the ridged portion 6. A gap "d" between the first electrode and the secondary electrodes was set at 5 μm.

Figure 3:
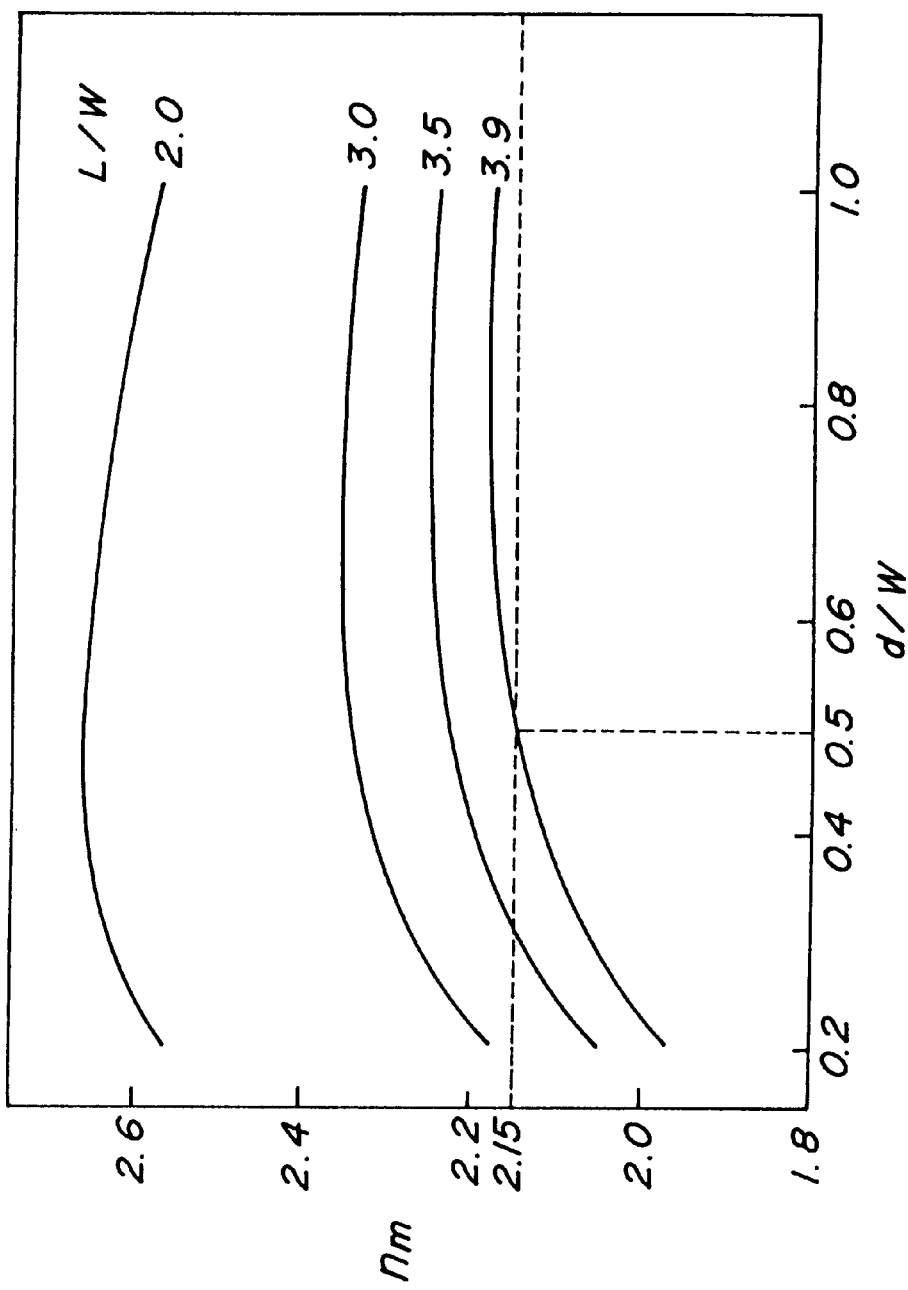
FIG. 3 is a graph showing the relationship among L/W, d/W and the effective refractive index nm of the modulation wave with respect to the light modulator in FIGS. 1 and 2.
Figure 4:
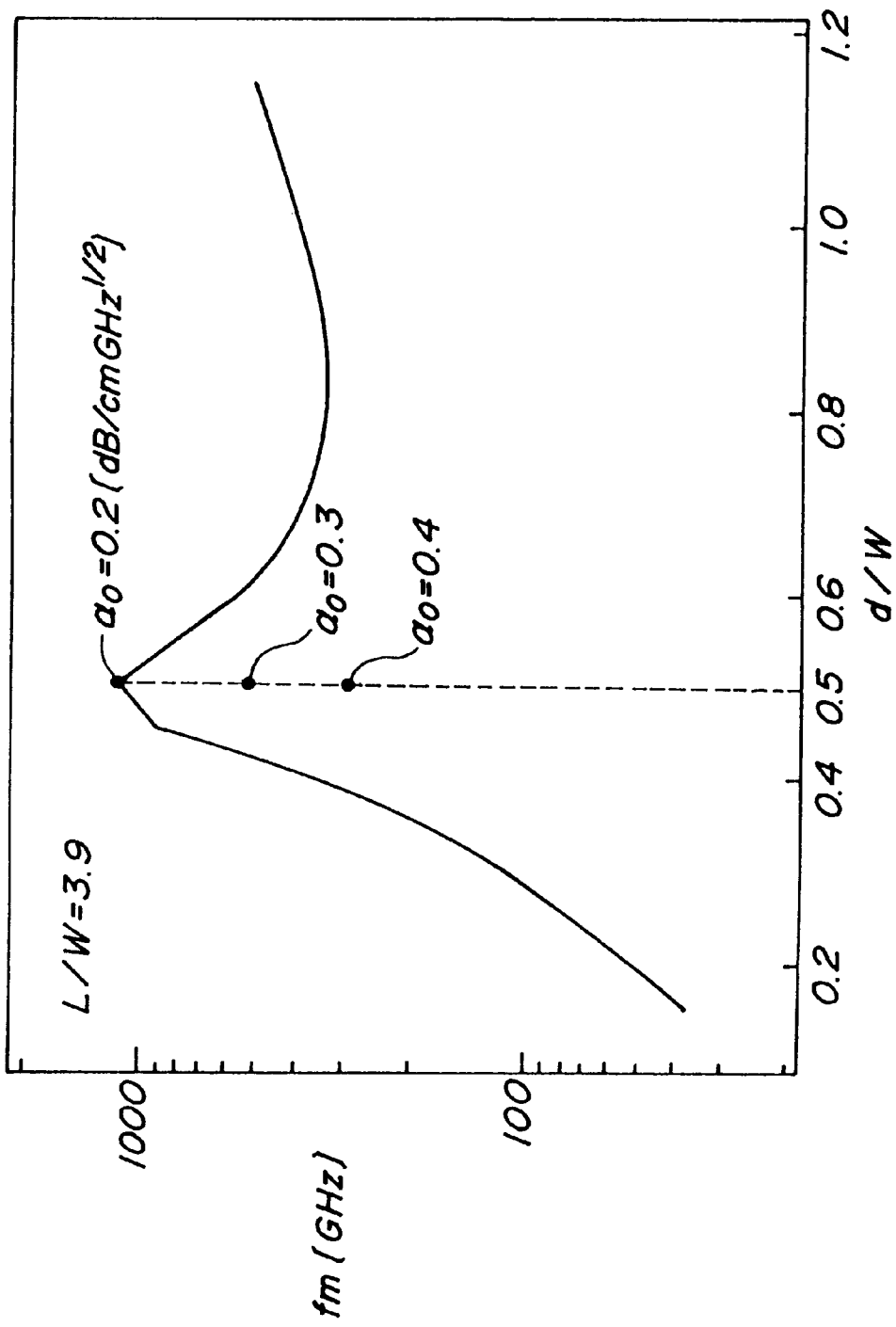
FIG. 4 is a graph showing the relationship between d/W and the modulating band width fm in the light modulator of FIGS. 1 and 2 when L/W was 3.9.
Figure 5:
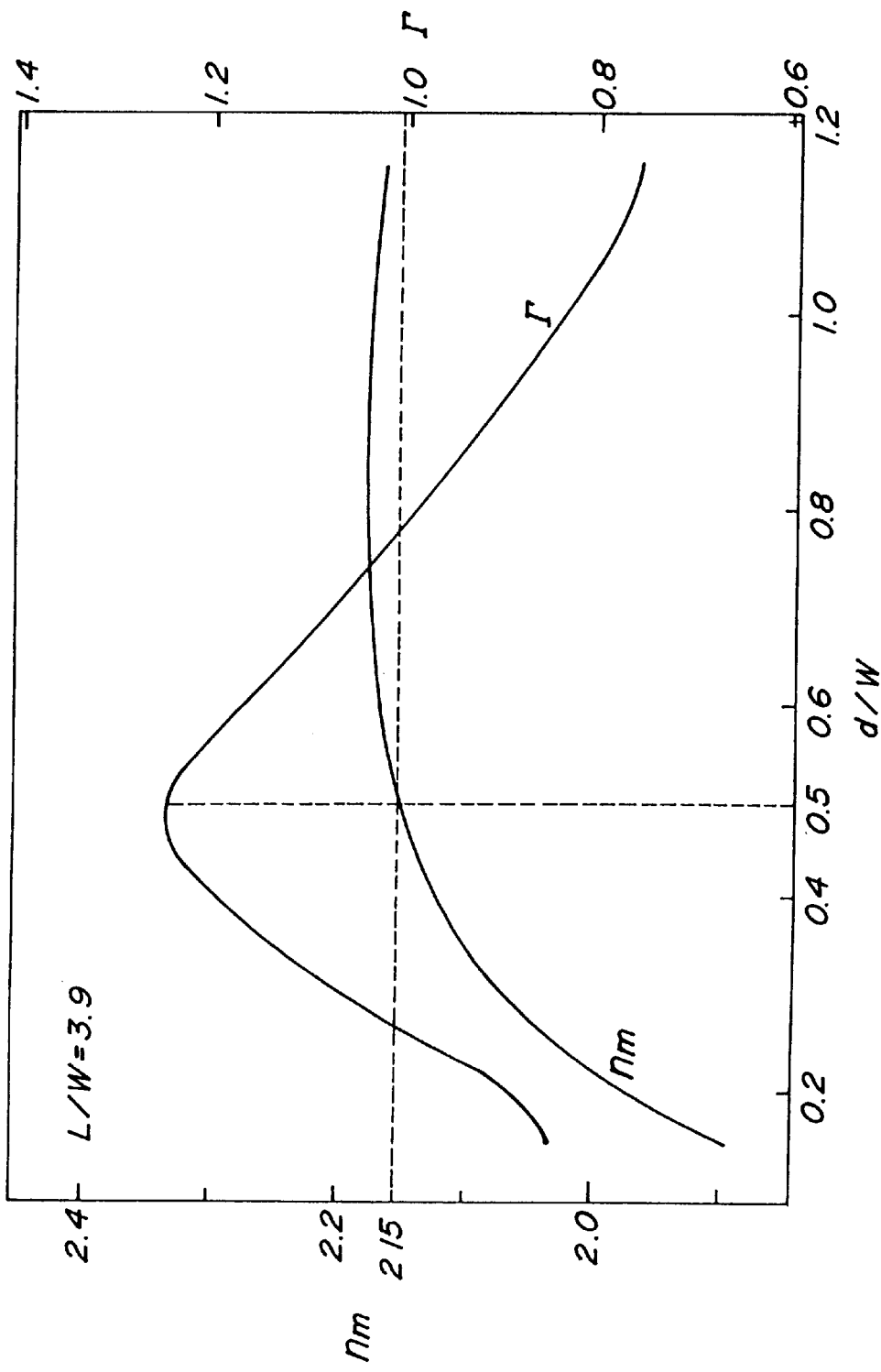
FIG. 5 is a graph showing the relationship among d/W, the effective refractive index nm of the modulation wave and the electric field correcting coefficient Γ with respect to the light modulator of FIGS. 1 and 2 when L/W was 3.9.

With respect to such a light modulator 1, while "d" was fixed at 5 μm, the width W of the optical waveguide 7 and the width L of the electrode 8 were varied as shown in FIGS. 3, 4 and 5, and the effective refractive index nm of the modulation wave, the width fm of the modulating band, and the electric field correction coefficient Γ were determined with respect to each of them by simulation. Results are shown in FIGS. 3, 4 and 5.

As shown in FIG. 3, it was clarified that as L is increased as compared with W, the effective refractive index nm of the modulation wave conspicuously lowers. This function and effect become most conspicuous if L is set at not less than 2 times as large as W. Although the effective refractive index of the light in the lithium niobate single crystal is about 2.15, it was clarified that the velocity can be particularly favorably matched if L is not less than 3.5 times but not more than 4.5 times as large as W. For example, the effective refractive index of the modulation wave can be matched with that of the light by setting L at 3.9 times as large as W and setting d/W at 0.5.

FIG. 4 is a graph showing changes in the width fm of the modulation band when d/W was varied in the case of L/W being 3.9. It is clarified that the width fm of the modulation band was conspicuously increased by setting d/W at 0.4 to 0.6. The width fm of the modulation band was maximum when d/W was set at 0.5.

FIG. 5 is a graph showing changes in the effective refractive index nm of the modulation wave and the electric field correction coefficient Γ when d/W was varied while L/W was fixed at 3.9 and the wavelength λ of the light was at 1.5 μm. According to this graph, the electric field correction coefficient Γ is increased to not less than 1.0 by setting d/W at 0.3 to 0.7, and this electric field correction coefficient Γ is more conspicuously increased by setting d/W at 0.4 to 0.6.

In the present invention, an underlayer made of a material having a dielectric constant smaller than that of a material constituting the substrate is optionally formed in each of the recesses, and a secondary electrode is optionally provided on the underlayer. As the material of the underlayer, an organic resin such as polyimide, Teflon, silicone, epoxy or urethane resin is particularly preferred, since these organic resins are solidified after being filled in the recess in a liquid state.

Figure 6:
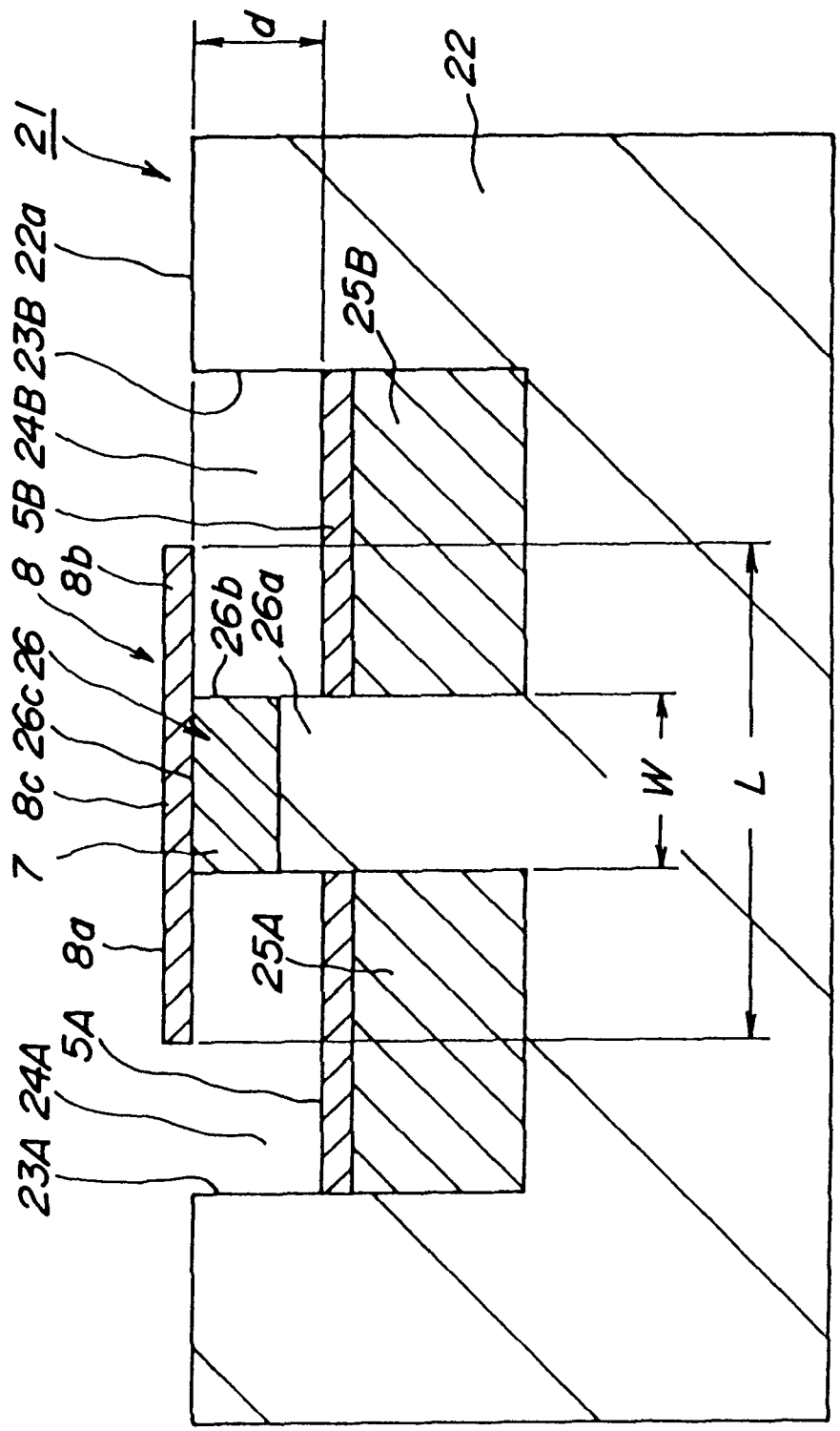
FIG. 6 is a cross-sectional view of a light modulator 21 as another embodiment of the present invention.
Figure 7:
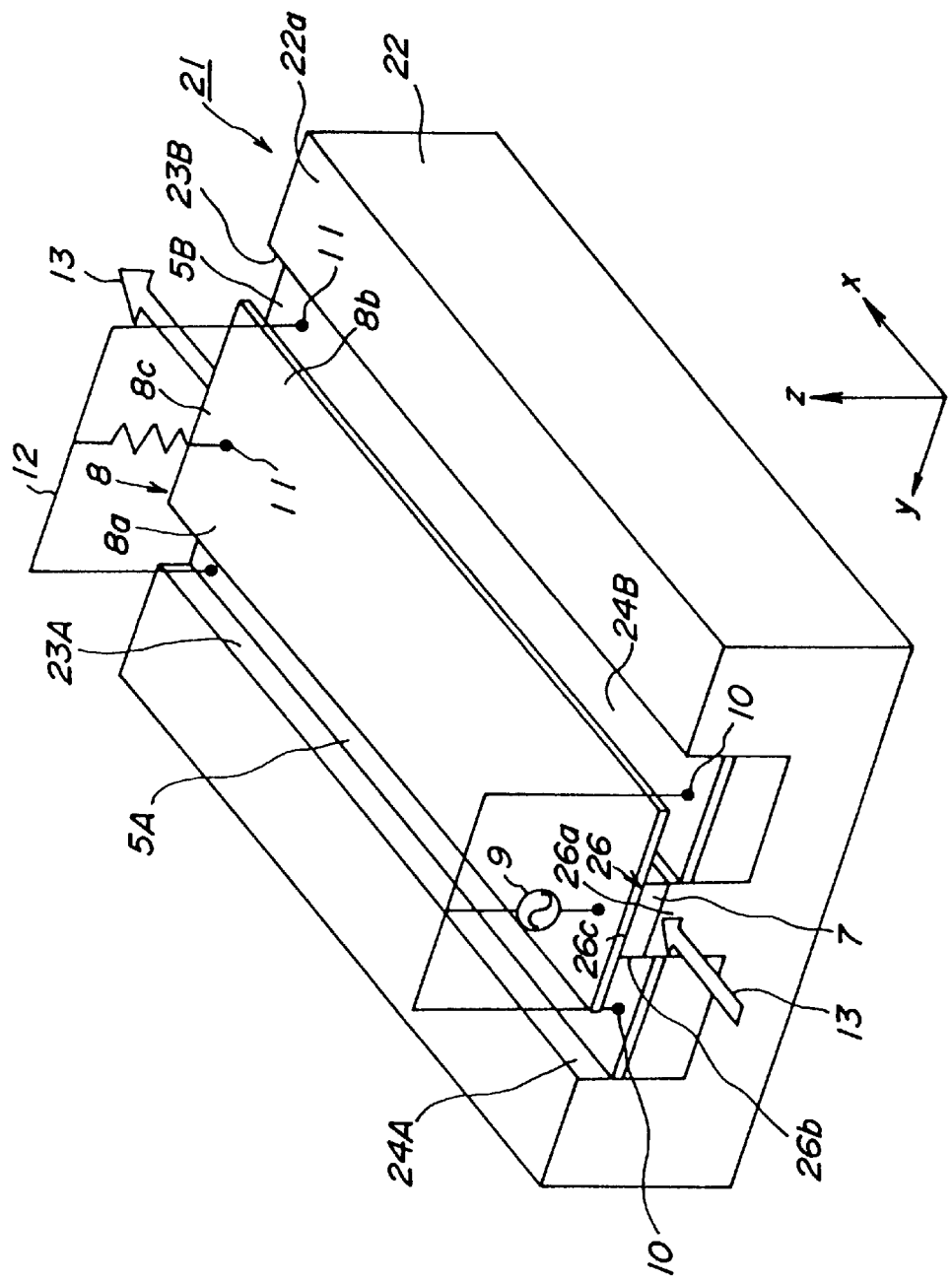
FIG. 7 is a perspective view of the light modulator 21 of FIG. 6.

FIG. 6 is a cross sectional view of a light modulator 21 as another embodiment of the present invention, and FIG. 7 is a perspective view of the light modulator 21 of FIG. 6. The light modulator 21 includes a substrate 22 having a flat board shape, an optical waveguide 7 formed on a side of a front surface of the substrate 22, and a first electrode 8 and secondary electrodes 5A, 5B for applying a signal voltage to a light propagating through the optical waveguide 7.

The substrate 22 includes a ridged portion 26, and the optical waveguide 7 is provided in an upper portion of the ridged portion 26. A base portion 26a of the ridged portion is provided under the optical waveguide 7. A reference numeral 26a denotes a side surface of the ridged portion, and a reference numeral 26c denotes an upper surface of the ridged portion 26. A recess 23A is provided at one side of the ridged portion 26, and another recess 23B is at the other side of the ridged portion 26. A first electrode 8 is provided on an upper surface 26c of the ridged portion 26. Underlayers 25A and 25B are provided in the recesses 23A and 23B, respectively, and secondary electrodes 5A and 5B are provided on the underlayers 25A and 25B, respectively.

The first electrode 8 includes a main portion 8c covering the front surface of the optical waveguide 7, a first overhanging portion 8a hanging over from the main portion 8c toward one side and a second overhanging portion 8b hanging over from the main portion 8c toward the other side. As a result, the first and second overhanging portions 8a and 8b are opposed to the secondary electrodes 5A and 5B, respectively.

As shown in FIG. 7, an oscillator 9 is connected to one end of each of the electrodes via a contact 10, whereas a terminal resistance 12 is connected to the other end of each of the electrodes via a contact 11. A reference numeral 13 denotes a light beam.

Figure 8:
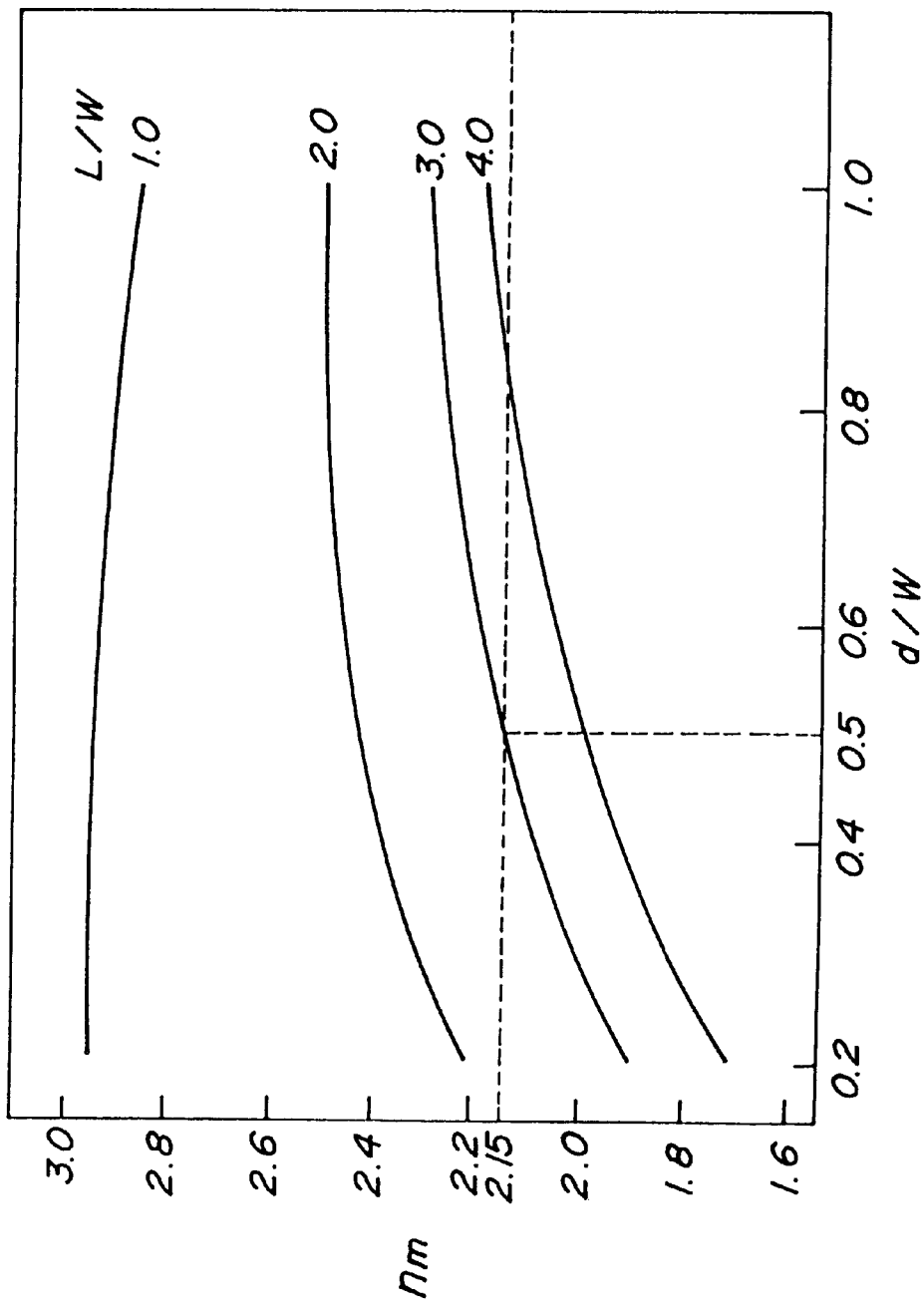
FIG. 8 is a graph showing the relationship among L/W, d/W and the effective refractive index nm of the modulation wave with respect to the light modulator in FIGS. 6 and 7.
Figure 9:
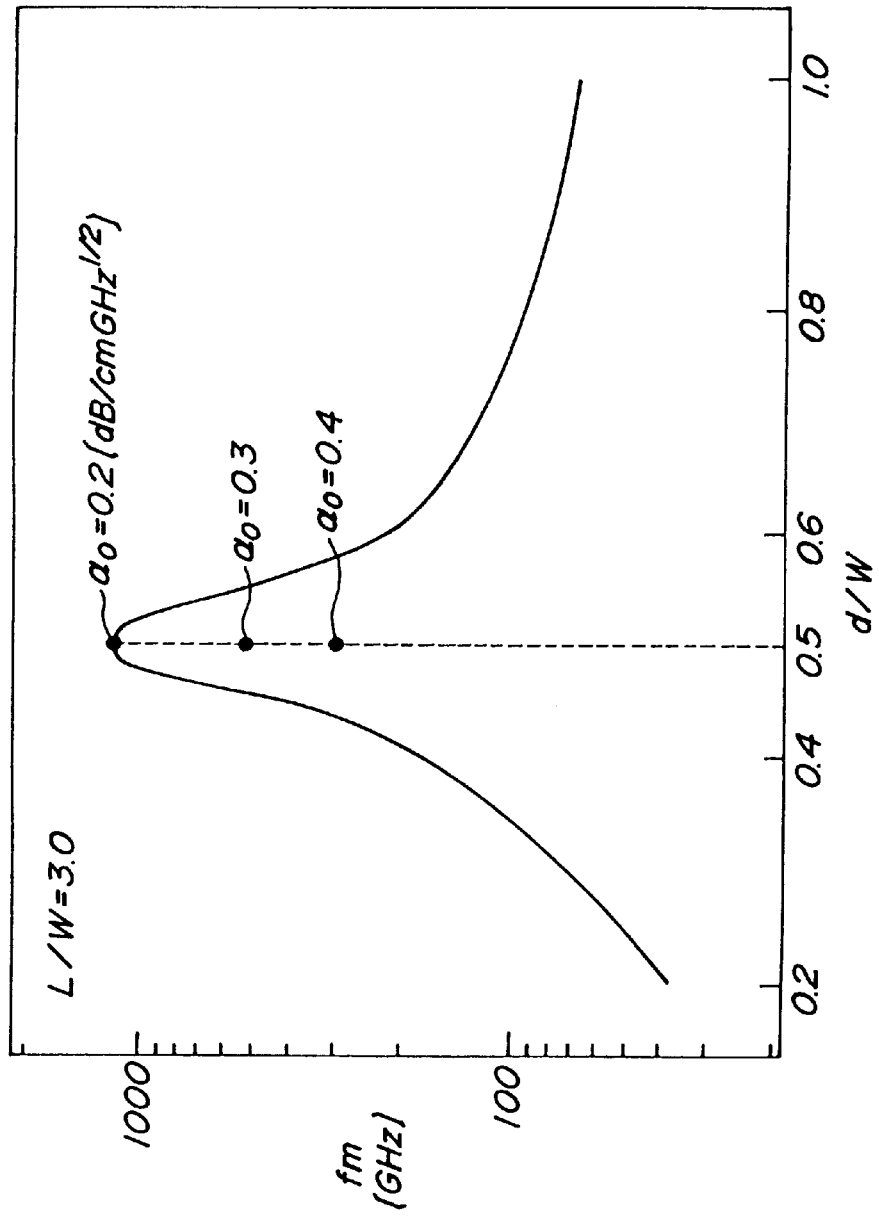
FIG. 9 is a graph showing the relationship between d/W and the modulating band width fm in the light modulator of FIGS. 6 and 7 when L/W was 3.0.
Figure 10:
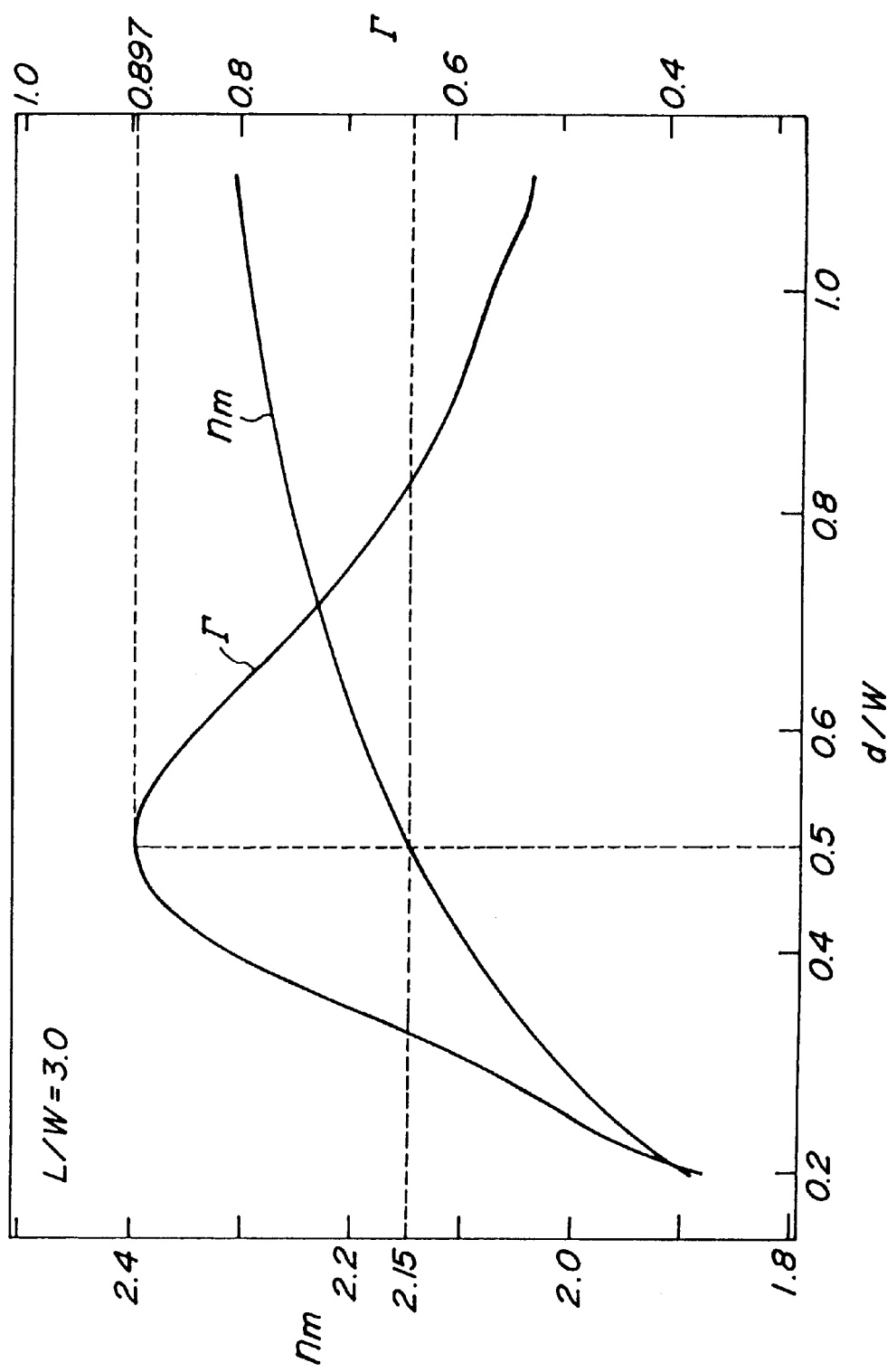
FIG. 10 is a graph showing the relationship among d/W, the effective refractive index nm of the modulation wave and the electric field correcting coefficient Γ with respect to the light modulator of FIGS. 6 and 7 when L/W was 3.0.

The light modulator 21 outlined in FIGS. 6 and 7 was produced and subjected to experiments and simulations. Results are shown in FIGS. 8, 9 and 10.

A film of a lithium niobate-lithium tantalate solid solution single crystal was formed in a thickness of 10 μm on a substrate made of a Z-cut wafer (LiNbO$_3$ single crystal, 1 mm thick) by a liquid phase epitaxial method, and a film of lithium niobate was formed in a thickness of 10 μm on the resulting film. Then, a straight, ridged optical waveguide was formed by cutting with a microgrinder. A ridge angle was about 90 degrees.

A film of a polyimide (a specific dielectric constant=3.3) was formed as an under layer 25A, 25B in each of recesses 23A and 23B in a thickness of 4 μm, respectively. Gold electrodes 5A and 5B were formed in a thickness of 1 μm on the under layers 25A, 25B, respectively, by vapor deposition. Further, the other gold electrode was formed on a glass substrate (not shown) by photolithography in a thickness of 1 μm. The glass substrate and the electrode 8 were bonded to an upper surface 6c of the ridged portion 6. A gap "d" between the first electrode 8 and the secondary electrodes 5A, 5B was set at 5 μm.

A light modulator of a mach-Zehnder type was completed by connecting a member in which a Y letter-shaped optical waveguide was formed on a substrate as viewed in plane to the above ridged type linear optical waveguide.

With respect to such a light modulator 21, while "d" was fixed at 5 μm, the width W of the optical waveguide 7 and the width L of the electrode 8 were varied as shown in FIGS. 8, 9 and 10, and the effective refractive index nm of the modulation wave, the width fm of the modulating band, and the electric field correction coefficient Γ were determined with respect to each of them by simulation. Results are shown in FIGS. 8, 9 and 10.

As shown in FIG. 8, it was clarified that as L is increased as compared with W, the effective refractive index nm of the modulation wave conspicuously lowers. This function and effect become clear if L is set at not less than 1.5 times as large as W.

FIG. 9 is a graph showing changes in the width fm of the modulation band when d/W was varied in the case of L/W being 3.0. It is clarified that the width fm of the modulation band was conspicuously increased by setting d/W at 0.4 to 0.6. The width fm of the modulation band was the maximum when d/w was set at 0.5.

FIG. 10 is a graph showing changes in the effective refractive index nm of the modulation wave and the electric field correction coefficient Γ when d/W was varied while L/W was fixed at 3.0 and the wavelength λ of the light was at 1.5 μm. According to this graph, the electric field correction coefficient Γ is increased to not less than 0.6 by setting d/W at 0.3 to 0.7, and this electric field correction coefficient Γ is more conspicuously increased by setting d/W at 0.4 to 0.6.

FIG. 11 is a sectional view of outlining a light modulator 32 according to a further embodiment of the present invention. The same reference numerals are given to the same constituent parts as shown in FIG. 1, and their explanation is omitted.

In this embodiment, secondary electrodes are formed on a substrate inside recesses, respectively, and a filler layer made of a material having a dielectric constant smaller than that of a material constituting the substrate is provided on each of the secondary electrodes. That is, the secondary electrode 5A is provided on the substrate inside the recess 3A, and the other secondary electrode 5B is provided on the substrate inside the other recess 3B. The filler layers 31A and 31B made of the same material as that of the above-mentioned under layer are provided on the electrodes 5A and 5B, respectively.

The light modulator 1 outlined in FIG. 11 was produced, and subjected to simulation tests. Results are shown in FIG. 12.

A film of a lithium niobate-lithium tantalate solid solution single crystal was formed in a thickness of 10 μm on a substrate made of a Z-cut wafer (LiNbO$_3$ single crystal, 1 mm thick) by a liquid phase epitaxial method, and a film of lithium niobate was formed in a thickness of 10 µm on the resulting film. Then, the resultant was subjected to ablation working by using a KrF excimer laser (wavelength: 248 nm) as a light source. An optical system was adjusted to give the density of an irradiated energy of 6 J/cm$^2$, whereas the pulse width was set at 15 nsec, the pulse frequency at 600 Hz, and the operating speed at 1.2 mm. Under the above condition, a ridged portion 6 of a Mach-Zehnder type was formed. The cross sectional shape of the ridged portion 6 was trapezoidal, and an inclined angle of a side surface 6b of the ridged portion 6 to a main plane 2a was 90 degrees.

Gold electrodes 5A and 5B were formed in a thickness of 1 µm in recesses 3A and 3B, respectively, by vapor deposition. Then, filler layers 31A and 31B were each formed of a polyimide film in the recesses 3A and 3B, respectively. The upper surface of each filler layer was set at the same level as that of the optical waveguide 7. A gold electrode 8 was formed on the upper surface of the optical waveguide 7 in a thickness of 1 µm by the vapor deposition. A gap between the first and secondary electrodes was set at 5 µm.

Figure 12:
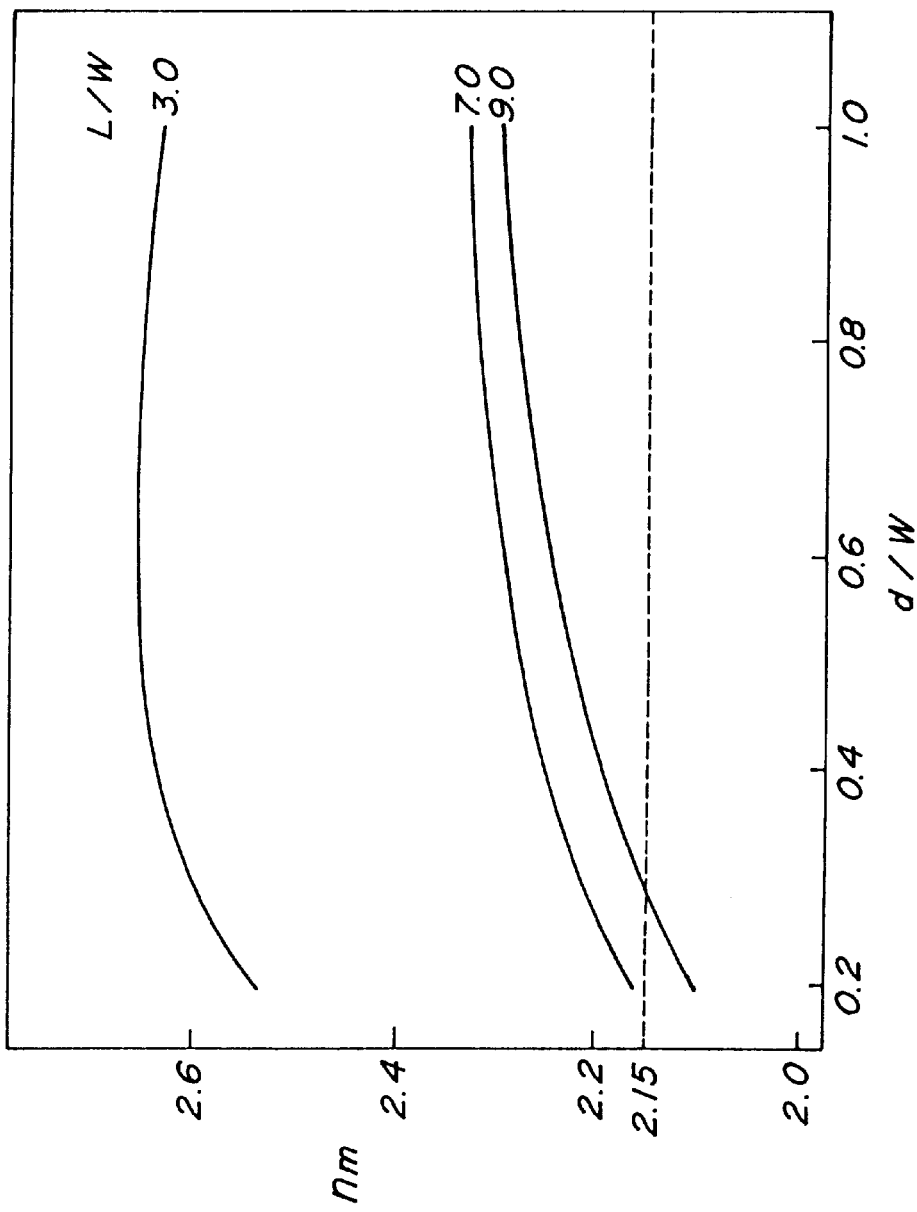
FIG. 12 is a graph showing the relationship among L/W, d/W and the effective refractive index nm of the modulation wave with respect to the light modulator in FIG. 11.

With respect to such a light modulator 1, while "d" was fixed at 5 µm, the width W of the optical waveguide 7 and the width L of the electrode 8 were varied as shown in FIG. 12, and the effective refractive index nm of the modulation wave was determined with respect to each of them by simulation. Results are shown in FIG. 12.

As shown in FIG. 12, it was clarified that as L is increased as compared with W, the effective refractive index nm of the modulation wave conspicuously lowers. This function and effect become most conspicuous if L is set at not less than 3 times as large as W. Although the effective light refractory index of the lithium niobate single crystal is about 2.15, it was clarified that the velocity is particularly favorably matched if L is not less than 7 times but not more than 30 times as large as W.

Further, since the L/W enabling the velocity matching can be increased in this way by the provision of the filler layers, this means that the width L of the electrode increases. Therefore, in this embodiment, the electrode power loss can be further reduced simultaneously with the realization of the velocity matching.

As mentioned above, according to the present invention, in the light modulator for modulating the light by applying a signal voltage upon the light, the velocity of the light can be matched with that of the modulation wave at a higher frequency as compared with the conventional light modulator. Thereby, the present invention can provide the light modulator having the novel structure which is operable at a frequency of not less than tens of GHz.

What is claimed is:

1. A light modulator for modulating light upon application of a signal voltage, said light modulator comprising a substrate, an optical waveguide formed on a side of a front surface of the substrate, and a first and a secondary electrode for applying the signal voltage to the light propagating through the optical waveguide, the first electrode being formed on a front surface side of the optical waveguide and including a main portion covering the front surface side of the optical waveguide and a first overhanging portion hanging toward one side from the main portion over a portion of the secondary electrode, wherein the first and secondary electrodes are spaced apart vertically between two horizontal levels and the optical waveguide is between the two horizontal levels of the first and secondary electrodes.

2. The light modulator set forth in claim 1, wherein the first electrode further includes a second overhanging portion hanging over from the main portion in the other side.

3. The light modulator set forth in claim 1, wherein the secondary electrode is formed in an inner side of the substrate as compared with the first electrode.

4. The light modulator set forth in claim 2, wherein the secondary electrode is formed in an inner side of the substrate as compared with the first electrode.

5. The light modulator set forth in claim 1, further comprising an additional secondary electrode wherein the substrate comprises a ridged portion, the optical waveguide is provided in the ridged portion, recesses are provided in opposite sides of the ridged portion, respectively, the secondary electrodes are provided in the recesses, respectively, and the first overhanging portion is opposed to the corresponding secondary electrode.

6. The light modulator set forth in claim 5, wherein two underlayers made of a material having a dielectric constant lower than that of a material constituting the substrate are provided in the respective recesses, and one secondary electrode is provided on each of the underlayers.

7. The light modulator set forth in claim 5, wherein the secondary electrodes are provided on the substrate in the respective recesses, and a filler made of a material having a dielectric constant lower than that of a material constituting the substrate is provided in each of the underlayers.

8. The light modulator set forth in claim 1, wherein a value L/W in which L is a width of the first electrode and W is that of the optical waveguide is not less than 1.5 to not more than 50.

9. The light modulator set forth in claim 5, wherein a value L/W in which L is a width of the first electrode and W is that of the optical waveguide is not less than 1.5 to not more than 50.

10. The light modulator set forth in claim 6, wherein a value L/W in which L is a width of the first electrode and W is that of the optical waveguide is not less than 1.5 to not more than 50.

11. The light modulator set forth in claim 7, wherein a value L/W in which L is a width of the first electrode and W is that of the optical waveguide is not less than 1.5 to not more than 50.

12. The light modulator set forth in claim 1, wherein the substrate is made of at least one kind of single crystals selected from the group consisting of a lithium niobate single crystal, a lithium tantalate single crystal, a lithium niobate-lithium tantalate solid solution single crystal, a potassium lithium niobate single crystal, a potassium lithium niobate-potassium lithium tantalate solid solution single crystal, a potassium titanyl phosphate single crystal and a gallium-arsenic single crystal.

13. The light modulator set forth in claim 5, wherein the substrate is made of at least one kind of single crystals selected from the group consisting of a lithium niobate single crystal, a lithium tantalate single crystal, a lithium niobate-lithium tantalate solid solution single crystal, a potassium lithium niobate single crystal, a potassium lithium niobate-potassium lithium tantalate solid solution single crystal, a potassium titanyl phosphate single crystal and a gallium-arsenic single crystal.

14. The light modulator set forth in claim 6, wherein the substrate is made of at least one kind of single crystals selected from the group consisting of a lithium niobate single crystal, a lithium tantalate single crystal, a lithium niobate-lithium tantalate solid solution single crystal, a potassium lithium niobate single crystal, a potassium lithium niobate-potassium lithium tantalate solid solution single crystal, a potassium titanyl phosphate single crystal and a gallium-arsenic single crystal.

15. The light modulator set forth in claim 7, wherein the substrate is made of at least one kind of single crystals selected from the group consisting of a lithium niobate single crystal, a lithium tantalate single crystal, a lithium niobate-lithium tantalate solid solution single crystal, a potassium lithium niobate single crystal, a potassium lithium niobate-potassium lithium tantalate solid solution single crystal, a potassium titanyl phosphate single crystal and a gallium-arsenic single crystal.

16. The light modulator set forth in claim 8, wherein the substrate is made of at least one kind of single crystals selected from the group consisting of a lithium niobate single crystal, a lithium tantalate single crystal, a lithium niobate-lithium tantalate solid solution single crystal, a potassium lithium niobate single crystal, a potassium lithium niobate-potassium lithium tantalate solid solution single crystal, a potassium titanyl phosphate single crystal and a gallium-arsenic single crystal.

17. The light modulator set forth in claim 9, wherein the substrate is made of at least one kind of single crystals selected from the group consisting of a lithium niobate single crystal, a lithium tantalate single crystal, a lithium niobate-lithium tantalate solid solution single crystal, a potassium lithium niobate single crystal, a potassium lithium niobate-potassium lithium tantalate solid solution single crystal, a potassium titanyl phosphate single crystal and a gallium-arsenic single crystal.

18. The light modulator set forth in claim 10, wherein the substrate is made of at least one kind of single crystals selected from the group consisting of a lithium niobate single crystal, a lithium tantalate single crystal, a lithium niobate-lithium tantalate solid solution single crystal, a potassium lithium niobate single crystal, a potassium lithium niobate-potassium lithium tantalate solid solution single crystal, a potassium titanyl phosphate single crystal and a gallium-arsenic single crystal.

19. The light modulator set forth in claim 11, wherein the substrate is made of at least one kind of single crystals selected from the group consisting of a lithium niobate single crystal, a lithium tantalate single crystal, a lithium niobate-lithium tantalate solid solution single crystal, a potassium lithium niobate single crystal, a potassium lithium niobate-potassium lithium tantalate solid solution single crystal, a potassium titanyl phosphate single crystal and a gallium-arsenic single crystal.

20. A light modulator for modulating light upon application of a signal voltage, said light modulator comprising a substrate, an optical waveguide formed on a side of a front surface of the substrate, and a first and two secondary electrodes for applying the signal voltage to the light propagating through the optical waveguide, the first electrode being formed on a front surface side of the optical waveguide and including a main portion covering the front surface side of the optical waveguide and a first overhanging portion hanging over toward one side from the main portion, wherein the substrate comprises a ridged portion, the optical waveguide is provided in the ridged portion, recesses are provided in opposite sides of the ridged portion, respectively, the secondary electrodes are provided in the recesses, respectively, and the first overhanging portion is opposed to the corresponding secondary electrode.

* * * * *